Figure 1:
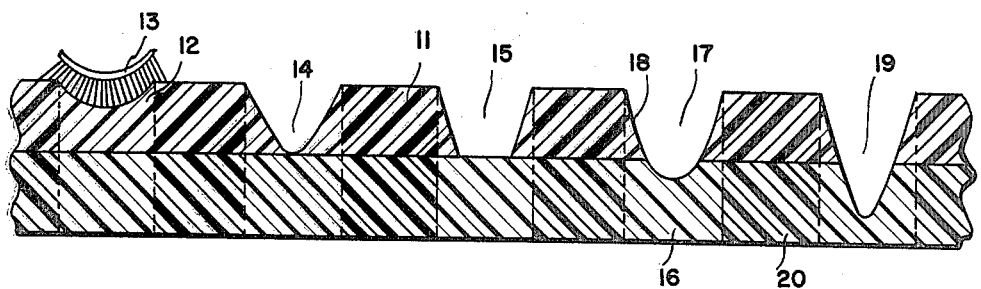

Feb. 9, 1965  H. HOERNER  3,169,066

PHOTOMECHANICAL METHOD OF PRODUCING PRINTING FORMS

Filed Jan. 11, 1960

INVENTOR.
Hans Hoerner
BY
*Curtis, Morris & Safford*
ATTORNEYS

United States Patent Office 3,169,066
Patented Feb. 9, 1965

3,169,066
PHOTOMECHANICAL METHOD OF
PRODUCING PRINTING FORMS
Hans Hoerner, Munich-Unterhaching, Germany
Filed Jan. 11, 1960, Ser. No. 1,517
Claims priority, application Germany Jan. 12, 1959
2 Claims. (Cl. 96—35)

This invention relates to printing forms having non-metallic printing surfaces and to photomechanical methods of making the same. The application relates in particular to printing forms comprising two or more laminae of non-metallic materials.

The copending application of Roman Freundorfer and Hans Hoerner, Serial No. 856,542, filed on December 1, 1959 (now U.S. Patent 3,060,027), describes a method of making printing forms such as printing plates or blocks suitable for use in either relief-or gravure-printing processes. These forms are prepared by sensitizing a polyamide blank, exposing the sensitized blank to an image, and developing the exposed blank by a combined chemical and mechanical treatment. The process results in the production of printing forms in which the raised elements of the forms have tapered sides, giving the elements a preferred conical shape.

The process described in said copending application involves the sensitization of a body of a polymer or copolymer, preferably a natural or synthetic polymer or copolymer of a polyamide, with a sensitizing substance such as chromate or bichromate, a diazo compound, or iron compounds known to affect a polymer body by hardening or tanning it on exposure to light. The sensitized body, conveniently in the form of a sheet, plate, or foil, is next exposed to strong light through a suitable line-or screen-image, either positive or negative, and is then developed. In the development, the non-hardened or untanned portions of the polymer are softened by the influence of chemicals, and the softened, unexposed portions are removed by gentle mechanical abrasion. Those portions of the plate hardened by exposure to light do not soften in the presence of the developing solution and are resistant to mechanical removal.

The polymer materials found particularly suitable for making printing forms according to that invention, and which may be used to advantage in the present invention, are polyamides, and may be homopolymers or copolymers, or mixtures of homopolymers and copolymers of polyamides. The polyamides may be natural or synthetic. The synthetic materials may be polymers of one or more dicarboxylic acids with one or more diamines, or may be produced by polymerization processes using diamine salts of dicarboxylic acids with aminocarboxylic acids. Aromatic, aliphatic and araliphatic monomers can be used in the synthesis. Copolymers containing ε-aminocaproic acid, or caprolactam, are particularly advantageous. Exemplary of the latter class of polyamide materials are 60–40 or 50–50 copolymers of hexamethylenediamine adipate and caprolactam, the proportions being by weight; copolymers of aminocaproic acid and ketopimelic acetous hexamethylene diamine containing, for example 85 parts by weight of aminocaproic acid; a coplymer of 40 parts by weight of caprolactam, 35 parts by weight of hexamethylene diamine adipate, and 25 parts by weight of ketopimelic acetous hexamethylene diamine; copolymers of p-phenylenedipropionic acetous hexamethylendiamin and caprolactam, for example in a 9:1 ratio by weight; copolymers containing equal parts by weight of caprolactam and 4,4'-diaminodicyclohexylmethane adipate; copolmers of equal parts by weight of caprolactam, p,p'-diaminodicyclohexyl methane, and hexamethylene diamine adipate; mixtures of these materials, etc. Natural polyamides such as Zein (derived from corn), Gliadin (derived from wheat), and Hordein (derived from barley) show particularly good resistance to attack by benzene, chlorinated hydrocarbons and water, and can be used to particular advantage in printing forms of the type herein described.

To make printing forms, the polyamide materials are commonly used in the form of blocks or sheets at least 0.2 mm. thick. Sheets of this thickness may require support, but thicker layers more than 1 mm. in thickness are self-supporting. The thickness of the layers can vary considerably. The polyamide blocks may be opaque or transparent, but if transparent have the advantage of being conveniently processable to give a make-ready on the reverse or non-printing side of the block, as hereinafter described.

The blocks are sensitized using materials known to the printing arts. Best results have been obtained using a solution of 25–75 percent by volume of acetone, the balance water, in which the sensitizing agent, preferably a bichromate salt, is dissolved. The water serves to dissolve the salt, while the acetone swells the polymer, making it diffusion receptive, and speeds penetration of the sensitizer into the polymer body. An amount of hardener between 0.5 or 1 percent to 10 percent, preferably 3 percent, by weight of the water-acetone solution is preferably employed. The solution is conveniently applied by brushing or spraying, particularly if a backed body is used, or may be applied simply by immersing the entire body into the solution. The body is usually treated with sensitizer solution for a minimum of 1 minute, preferably for 2–3 minutes. The sensitized blank may conveniently be dried at a temperature of about 50° C. These operations are carried out under diffuse light insufficient to expose the plate.

The dried plate is then exposed to the image to be copied, which may be a positive or negative line- or screen-image, by techniques known to the art using, e.g., a carbon arc or other strong light source. No movement of the light source to give angularly incident rays is required, as is the case for some processes which depend on such incident rays to expose laterally disposed sub-surface portions of a transparent polymerizable coating.

If transparent blocks are used, hardening can occur in all portions of the block previously treated with sensitizing solution. In particular, the reverse or non-printing side may be hardened in a pattern corresponding with the image. The hardening effected on the reverse side may be less pronounced than on that face directly exposed, because of the diminished intensity of the light after traversal of the block. However, by development of this image on the reverse side of the block, a make-ready is quickly and conveniently formed.

Development of the exposed plate follows by a process in which both chemical and mechanical effects are involved. The plate is treated with a developing soultion which softens, and may swell, but does not dissolve, the unexposed material. The plate is mechanically abraded to remove the softened portions. Although alternate steps of softening and abrading can be employed, generally with repetition, the development is most conveniently done by rubbing the exposed plate with a material, such as plush or sheared velvet, having a plurality of fine, flexible sharp bristiles moistened with the developing solution. A foam rubber pad, covered with a moistened plush or velvet fabric, has been used with particular success.

As developers, solutions in which the polyamides soften, but do not dissolve, are used. Among these, aqueous solutions of water-miscible monohydric and polyhydric alcohols, particularly of the miscible monohydric lower alcohols (1 to 4 carbon atoms) are preferred. The solutions contain a minimum of about 2 percent by volume of water, and preferably contain about 4 percent by volume of water. For still faster development, solutions having 6–8 percent by volume of water can be employed. It is emphasized that these solutions do not dissolve unexposed polyamide polymer of the printing forms, as has been proved by allowing the forms to soak in the solutions for long periods without significant removal of unexposed polymer.

Thus, a mechanical brushing away of softened polymer is necessary. However, brushing with pure alcohols will not remove significant amounts of unexposed polymer, and only aqueous solutions of the alcohols are effective. A water content in the alcohols greater than about 10 percent by volume brings about very rapid development. Where high definition is not critical, such solutions can be used to advantage, and the make-ready formed on the reverse side of exposed transparent polyamide printing forms is conveniently developed by rubbing the reverse side of the forms with an alcohol solution containing 15 percent–20 percent by volume of water. Still higher water contents, greater than about 30 percent, may cause significant solution of the polyamides, and are to be avoided. However, at water concentrations higher than about 50 percent by volume, the solubility of some of the polyamides in the solutions falls sharply.

In the developers, acid may be substituted for water in whole or in part. As the pH of such solutions decreases, the amount of water required to yield to a given softening or dissolving action is also decreased.

Although mixtures of lower monohydric alcohols, particularly n-propanol, and water or acid are preferred developing agents, other materials can be used. For example, miscible polyhydric alcohol mixtures such as a mixture of 85 percent by volume of ethylene glycol and 15 percent by volume of aqueous HCl (desity 1.15, 10 percent in water), or a mixture of 80 percent by volume of diacetone alcohol and 20 percent by volume of aqueous HCl (density 1.15, 10 percent in water) are suitable developers for the polyamides. In the same way, lower and higher alcohols and glycols can be mixed with materials such as ethylenechlorohydrin, phenol, etc. to form dilute developing solutions. When natural polyamides such as Zein are used to make printing blocks, highly alkaline aqueous solutions, e.g. of pH 10 or more, can be used as developing agents with or without alcohol additions.

By varying the strength of the developing solution, the pressure used in the mechanical abrading process, and the developing time, the operator has several means of controlling the developing process. In general, using the preferred dilute aqueous alcoholic developers, and developing times of from 30 seconds to 2 minutes, the pressures used for abrading the printing blocks will vary from 2 grams per square centimeter to 5 grams per square centimeter.

Although the above-described process yields exceptionally goods results in the preparation of printing plates on which the image has been reproduced through a raster (so-called "autotypes"), difficulty is sometimes encountered in preparing plates suitable for reproducing black and white relief images (so-called line-work). The production of plates of this latter kind is often hindered by an inability to prepare the plates with recessed portions of sufficient depth. Thus, for example, using the known method, the depth of the recessed portions usually does not exceed 0.3 mm. as a maximum. If an attempt is made to increase the depth of these recessed portions, fine details of the image, for example, lines in the image, may lose clarity and fineness of detail.

The present invention concerns printing forms from which line-work can readily be produced. These forms have recessed portions which may be 0.5 mm. deep, or deeper. (It is to be understood that the depth of the recessed portions is also a measure of the height of the printing elements in a printing plate of this type.)

According to the present invention, printing forms which comprise a plurality of layers of different materials are employed. In the development of printing plates of this type, the plates are treated with different developing agents at different stages of the development, each of which agents shows a different specific swelling power for the separate laminae comprising the printing plate. The printing form of the invention, comprising a plurality of layers of different materials, each of which reacts in a different fashion to the different developing solutions employed, permits the production of recessed portions of greater depth than heretofore possible. The different developing solutions used are specific to each layer of the laminated printing plate, so that during the mechanical abrasion of the plate under the influence of a given developer, the layer treated will react to the specific developer being employed, while the remaining layers are unaffected. In this manner, recessed portions of considerable depth can be obtained without any loss of detail in the picture being developed.

According to the invention, for example, a printing plate may comprise two layers. The uppermost or outermost layer, that is the printing surface, may for example be comprised of a polyamide composition of a type herein earlier described. This layer may be developed according to methods already described. The layer underlying this superfiical layer may then next be treated with a second developer to which the underlayer is sensitive but which has no further effect on the already developed outer layer.

Although polyamide materials of the type herein described are preferred for the superficial or printing layer because of their exceptional properties, different synthetic and natural materials can be employed as the printing layer according to the process of the invention, providing only that they are light sensitive.

As the underlying layer or layers, through which the depth of the recessed portions is extended, a similar choice of different materials exists. For example, materials such as rubber, gelatin, polystyrene, polyvinyl chloride, polyvinyl alcohol, cellulose, cellulose derivatives, and synthetic or natural polyamides different from those of the first layer can be employed.

A better understanding of the invention and an appreciation of its many advantages can be had by referring to the accompanying drawings. In the drawings, FIGURE 1 shows a printing form in the shape of a plate, said plate having a surface layer, for example of a polyamide, comprising hardened portions 11 which have been sensitized and hardened by exposure to light, and softer portions 12, which represent those portions of the plate which have been exposed to light through an image desired to be reproduced by the plate. A plurality of fine, flexible bristles, shown in FIGURE 1 as velvet-like cloth 13, is used to abrade unhardened portions 12 of the upper sensitized layer. Continued abrasion using a material such as cloth 13 will eventually develop in softened portions 12 V-shaped grooves having the form of groove 14 of FIGURE 1. Groove 14 has a shape which gives raised portions 11 of the printing plate tapered sides of a form highly desirable in the art. Still further abrasion in the presence of a developing agent by which the material of the upper layer is softened or swelled will produce a groove of the shape indicated by reference numeral 15. Such continued abrasion steepens the sides of the groove, but does not result in any increased deepening of the groove because of the resistance of the lower layer of the plate to the solvent materials used on the upper layer.

By now employing a developing agent to which unhardened portions 16 of the lower layer of the plate are sensitive, but to which the unhardened portions 12 of the upper layer are indifferent, one can bring about a deepening of the groove without any further removal of side portions of the upper layer. FIGURE 1 shows the development of such a deepened groove 17. A developer to which the upper layer is indifferent is employed so that side portions 18 of the upper layer remain unaffected by the continued working of the groove. Further abrasion causes deepening of groove 17 until it assumes the form of groove 19, which is of the shape and depth desired for good black and white printing.

Although the lower layer of FIGURE 1 has been shown as comprised of a sensitizable material (e.g. a polyamide) which can be sensitized and exposed to light to have hardened portions 20 and soft portions 16, such is not critical to the invention. If the superficial layer is one which is opaque, blocking light to the underlayer, or if the underlayer is of a material not susceptible to sensitization, grooves of the form of groove 19 can still be successfully produced. The process of mechanical abrasion, guided by the form of tapered sides 18 of the upper layer, will not result in undue widening of the grooves in the underlayer. As can be seen in FIGURE 1, groove 19 does not approach hardened portions 20 of the underlayer, and thus, the hardening of these portions is not critical.

Figure 2:
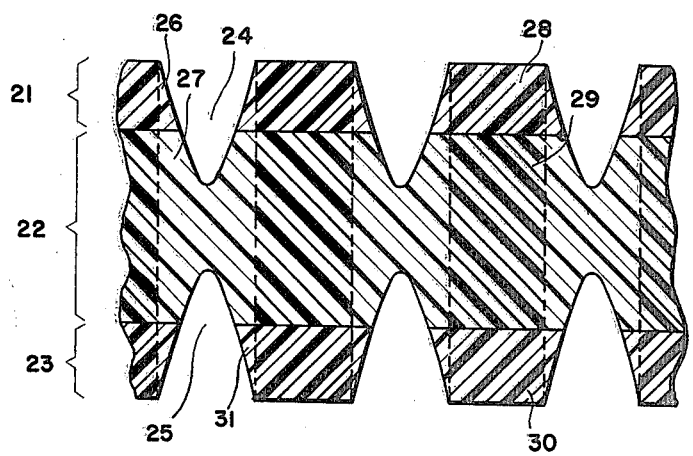

FIGURE 2 of the drawings shows a composite printing plate of the type described herein, which plate has three laminae. Lamina 21 comprises the printing surface and is supported by intermediate layer 22 of a material different from that in layer 21. Layer 23 comprises the reverse side of the printing plate, and comprises a material like or different from that in layer 21, but different from that in layer 22. Extending from layer 21 into layer 22, grooves 24 comprise the recessed portions of the printing surface. Extending from layer 23 into layer 22, grooves 25 comprise a make-ready surface corresponding to the image in the upper layer 21. Because layer 23 is nonprinting, deep grooves therein are not critical; a mere development of layer 23, without extension of grooves 25 into layer 22, often suffices.

The exposure of a printing plate having a make-ready, such as the plate shown in FIGURE 2, is readily accomplished in one step when all three layers 21, 22, and 23 of the plate are made of transparent materials which have been sensitized with a sensitizing agent. Exposure of the upper surface 21 to light through an image then brings about simultaneous exposure and hardening of illuminated portions in all three layers 21, 22, and 23. Separate exposure of the upper and lower faces, or of the individual layers with later combination into a laminated plate, is not necessary. Thus, in FIGURE 2, groove 24 extends through unhardened portions 26 of upper layer 21 into unhardened portions 27 of layer 22; groove 25 of the make-ready is in unhardened portions 27 and 31 of layers 22 and 23 respectively. In a like fashion, underlying exposed or hardened portions 28 of layer 21 are corresponding hardened portions 29 of layer 22 and hardened portions 30 of layer 23.

Although FIGURE 2 shows intermediate layer 22 sensitized in all portions and hardened in portions 29 thereof, it is to be understood that this layer may be sensitized or hardened only in those portions adjacent layers 21 and 23 or need not be at all sensitized or hardened. As discussed earlier, the shape of grooves 24 and 25 is determined primarily by the sensitization, hardening, and further development of the superficial layers and their influence on the later course of abrasion.

The practice of the invention is illustrated in the following examples.

*Example 1*

A printing plate comprising a 1.5 mm. thick under layer of a copolymer of 50 percent caprolactam and 50 percent 4,4-diaminodicyclohexylmethane adipate, and a 0.3 mm. thick upper layer of a copolymer of equal parts of p,p'-diaminodicyclohexylmethane, caprolactam, and hexamethylene adipate was sensitized by immersion in bichromate solution, dried, and then exposed to light through a negative resting upon the thinner upper layer. This upper layer was next developed by rubbing with a plush tampon moistened with a solution of ethyl alcohol containing 2–3 percent by volume of water. Under the combined chemical and mechanical action of this treatment, unilluminated portions of the upper layer were softened and mechanically removed according to the process earlier described herein. After this treatment, further development with the plush tampon was carried out using a 10 percent solution of methanol in water. With this developing agent, the grooves partially developed in the upper layer by the earlier developing treatment were deepened into the second layer.

*Example 2*

A printing form having three laminae, comprised the following materials. Between two layers, each 0.3 mm. thick and of a copolymer of equal parts of p,p'-diaminodicyclohexylmethane, caprolactam, and hexamethylene diaminoadipate, was sandwiched a 1.2 mm. thick layer of a soluble polyvinyl chloride copolymer. The laminated plate was sensitized with a bichromate solution and dried, as known in the art and herein described, and exposed through a negative. The printing side plate was developed by abrading in the presence of a 4 percent aqueous solution of ethyl alcohol and then with methyl-ethyl ketone. A make-ready was prepared by treating the reverse side of the plate with 15 percent aqueous ethyl alcohol.

*Example 3*

A 5 mm. thick layer of rubber containing filler materials was provided with an 0.2 mm. thick coating of a copolymer of equal parts of p,p'-diaminodicyclohexylmethane, caprolactam, and hexamethylenediamine adipate. The resulting plate was sensitized according to the methods described herein. After sensitization, the plate was exposed through an image, and the upper polyamide layer was developed using a solution of ethyl alcohol containing 2–3 percent water. The development was continued into the rubber layer employing swelling agents for rubber, such as benzene ($C_6H_6$).

As can be seen from the examples, the mechanical details of development remain the same in all stages of the development. Only the developing agent is changed as the various layers of the laminated printing plate are encountered.

To achieve still greater depth for the recessed portions of the printing plate, a still greater number of layers can be combined. One or more of these layers may comprise a material having rigidity or resistance to deformation, for example a metallic layer or a lamina of a polyester material.

Although specific embodiments have been shown and described, it should be understood that they are illustrative, and are not to be construed as limiting the scope and spirit of the invention.

What is claimed is:

1. The method of making printing forms having a printing surface with deeply recessed portions having an inverted conical cross-section, which method comprises exposing a light sensitized laminated body to a light image, whereby those portions of the sensitized body exposed to light are hardened, said laminated body comprising a light sensitized first solid polymer layer having a printing surface and a reverse surface, and at least one layer of an unsensitized second solid polymer material, different from the polymer of said first layer, subjoined to said reverse surface; and subsequently developing said body by partially removing unhardened portions of said first polymer layer by repeatedly softening and abrading unhardened surface portions of the layer with a plurality of fine, flexible bristles moistened with a first softening agent which softens said first polymer but to which said second polymer is indifferent, whereby recessed portions are formed in said first polymer layer and raised printing elements having a truncated conical cross-section are defined between said recessed portions, and then removing portions of said layer of second polymer by repeatedly softening and abrading exposed portions of the layer with a plurality of fine, flexible bristles moistened with a second softening agent which softens said second polymer but to which said first polymer is indifferent, whereby said truncated conical recessed portions are extended from said first polymer layer into said second polymer.

2. The method of making printing forms having a printing surface and a make-ready surface, which surfaces have deeply recessed portions having an inverted conical cross-section, which process comprises exposing a transparent light sensitized laminated body to a light image, whereby those portions of the sensitized body exposed to light are hardened, said laminated body comprising a light sensitized solid polymer printing layer, a light sensitized solid polymer make-ready layer, and at least one layer of an unsensitized solid polymer material different from the polymer of said printing layer and said make-ready layer therebetween; and subsequently developing said body by partially removing unhardened portions of said printing layer and said make-ready layer by repeatedly softening and abrading unhardened portions thereof with a plurality of fine, flexible bristles moistened with a softening agent which softens said printing layer and said make-ready layer but to which said layer of different solid polymer material is indifferent, whereby recessed portions are formed in said printing and make-ready layers and raised printing elements having a truncated conical cross-section are defined between said recessed portions in said printing layer, and then removing portions of said layer of different solid polymer material by repeatedly softening and abrading exposed portions thereof with a plurality of fine, flexible bristles moistened with a softening agent for said different polymer material and to which said printing and make-ready layers are indifferent, whereby said truncated conical recessed portions are extended from said printing and make-ready layers into said layer of different solid polymer material.

References Cited in the file of this patent

UNITED STATES PATENTS

| | | |
|---|---|---|
| 1,587,220 | De'Sperati | June 1, 1926 |
| 2,065,302 | Bocca et al. | Dec. 22, 1936 |
| 2,365,416 | Kuhne | Dec. 19, 1944 |
| 2,459,129 | Gresham et al. | Jan. 11, 1949 |
| 2,702,243 | Schmidt | Feb. 15, 1955 |
| 2,772,972 | Herreck et al. | Dec. 4, 1956 |
| 2,902,365 | Martin | Sept. 1, 1959 |
| 2,964,401 | Plambeck | Dec. 13, 1960 |
| 2,997,391 | Murray et al. | Apr. 22, 1961 |
| 3,031,302 | Bayer | Apr. 24, 1962 |

FOREIGN PATENTS

| | | |
|---|---|---|
| 801,093 | Great Britain | Sept. 10, 1958 |
| 3,060,027 | Germany | Oct. 23, 1962 |